(12) United States Patent
Massey

(10) Patent No.: US 6,364,122 B1
(45) Date of Patent: Apr. 2, 2002

(54) APPARATUS FOR SEPARATING LIQUIDS FROM SOLIDS

(75) Inventor: Jimmie W. Massey, Van Vleck, TX (US)

(73) Assignee: Aqua-Zyme Disposal Systems, Inc., Van Vleck, TX (US)

( * ) Notice: Subject to any disclaimer, the term of this patent is extended or adjusted under 35 U.S.C. 154(b) by 0 days.

(21) Appl. No.: 09/796,057

(22) Filed: Feb. 28, 2001

(51) Int. Cl.[7] .............................................. B01D 29/05
(52) U.S. Cl. ........................ 210/455; 210/484; 210/498; 210/499
(58) Field of Search ................................ 210/455, 477, 210/484, 485, 498, 499

(56) References Cited

U.S. PATENT DOCUMENTS

| | | | | |
|---|---|---|---|---|
| 1,311,639 | A | * | 7/1919 | Cartwright .................. 210/499 |
| 4,594,280 | A | * | 6/1986 | Coyon et al. ............... 210/498 |
| 4,664,798 | A | * | 5/1987 | Bergh ......................... 210/455 |
| 4,871,454 | A | * | 10/1989 | Lott ............................ 210/455 |
| 4,929,353 | A | * | 5/1990 | Harris ......................... 210/473 |
| 5,405,539 | A | * | 4/1995 | Schneider .................. 210/455 |
| 5,595,654 | A | * | 1/1997 | Caughman, Jr. et al. .... 210/484 |
| 6,004,461 | A | * | 12/1999 | Harris ......................... 210/455 |
| 6,146,328 | A | * | 11/2000 | Caughman, Jr. et al. .... 210/484 |
| 6,258,268 | B1 | * | 7/2001 | Lake ........................... 210/477 |

* cited by examiner

*Primary Examiner*—Christopher Upton
(74) *Attorney, Agent, or Firm*—Bracewell & Patterson, LLP

(57) ABSTRACT

A portable liquid-solid separator tank has a bed, surrounding exterior walls, a dividing wall. The exterior walls of the tank include a gasket door to allow easy removal of the filtered sludge. The exterior walls of the tank support sludge include inlet valves where the sludge is provided by a hose from a storage and/or mixing tank. The exterior walls also include a liquid outlet valve or valves for the filtered liquid to be removed and roller wheels that enable the tank to be easily transported. The tank contains a filter media mounted on a filter media support structure supported by the interior of the bed, exterior walls, and the dividing wall. The filter media support structure is composed of perforated metal supports and expanded metal supports. The use of the expanded metal supports in the filter media support structure increases the opening space in the support structure and reduces the amount of time it takes to filter the sludge. The filter media overlays the support structure, extending along the bed, up the sides and along the dividing wall. In operation, the separator tank receives the sludge from which its solid content is then separated by the effect of gravity and hydrostatic pressure which force the liquid through the filter. Liquid is drained out of the bottom of the tank, and the solids are then transported within the vessel.

8 Claims, 3 Drawing Sheets

APPARATUS FOR SEPARATING LIQUIDS FROM SOLIDS

BACKGROUND OF INVENTION

1. Field of Invention

The present invention provides liquid-solid separators, particularly portable separators for treatment of sludge in bulk. More specifically, the present invention provides an improved filtration system for extracting liquid from a sludge or slurry and separating the resulting liquids and solids for separate disposal or recovery.

2. Description of the Prior Art

Liquid-solid separators have been used to remove the liquid from solids in a sludge. The term sludge is widely used to refer to a variety of mixtures and generally includes any solid-liquid mixture or slurry such as sewage and industrial waste. The sludge contains any ratio of liquids to solids. The sludge often has had substantially more liquid material than solid material. Separation of the sludge into its liquid and solid components, also known as "dewatering," has been desirable for recovery or disposal of the one or both of the components.

Liquid-solid separators have been desirable for several reasons. Environmental regulations have required the water content of solid waste to be below specified levels before it is accepted in a landfill. Solid waste frequently had to be hauled to a disposal site; freight carriers, as well as the disposal site operation, often charged based on the weight. Also, in many industrial processes, the finished product would be either a solid or a liquid contained in a sludge, and it has been necessary to separate the solid from the liquid phase in order to isolate the finished product.

Generally, during separation, the fluid component of the sludge has been drawn through a filter in one of two ways, vacuum drainage or gravitational drainage. Vacuum drainage required the use of a pump in flow communication with the filtrate cavity of the filter. In order to utilize a pump that can develop a vacuum, the filtrate cavity had to remain below the liquid surface level at all times. In this type of system, activation of the pump drew the sludge liquid as well as the sludge solids toward the filters thus often resulted in filter blockage. During the initial stages of dewatering, when the liquid concentration was highest, the smaller sludge solid particles more readily flowed toward the filter and tended to block the filter element. Blockage of the filter element hindered dewatering speed and efficiency.

The other typical manner of dewatering sludge was gravitational drainage which involved placing the sludge into a container that had filters therein. The liquid in the sludge passed through the filters and thence from the container; however, the filters did not permit the solids to pass through. Therefore, the solids remained in the container and were removed after the dewatering operation had been completed.

Gravitational drainage did not require a vacuum, therefore, did not require the maintenance of the filtrate cavity below the sludge liquid surface. Consequently, the filters in such a system extended the entire height of the container and, thereby, provided greater drainage surface area. In gravitational drainage the sludge solid particles settled on the filter surface in a more uniform manner and provided an additional filtering layer. Thus, the filters did not experience blockage; however, gravitational drainage was slow.

One type of prior art separator is disclosed in U.S. Pat. No. 6,004,461. A phase separator had a tank having a bed and surrounding sides. A metal support plate grating is supported by the bed and walls in a manner that left a space between the grating and the wall and the bed to have a liquid collection space that collects the filtered liquid. A screen was attached to the grating which was used to distribute the weight of the sludge on the grating so that the filter did not sag down into the spaces in the grating and become lodged or torn. A filter positioned over the screen and grating, and sludge was placed in the tank on top of the filter. The liquid in the sludge moved through the filter, screen, and grating into the liquid collection space. Movement of the sludge through the filter, screen, and grating was accomplished by gravity, hydrostatic pressure, and by wicking or capillary action. The completed dewatering of the sludge, so far as is known, required approximately six days. A drain was provided to allow such liquid to be released from the tank. The dewatered sludge along with the filter and screen was disposed at the disposal site.

Filter boxes have used superimposed metal support plate and screens in order to prevent the filter from extending into the metal support plates and tearing the filter. The forces exerted on the filter by the large amounts of sludge introduced into the filter box required metal support plates commonly having less than forty (40) percent pore space. These metal support plates were used due to their strength which permitted them to withstand the force of the incoming sludge. One common type of support plate was known in the industry as "perforated plate." The filter media support structure was formed of perforated metal plates having approximately forty (40) percent pore space. Additionally, a screen was placed on the perforated metal plates in order to prevent sagging and tearing of the filter. The perforated metal plate and screen were the primary element that contributes to the length of time required to filter sludge in a gravitational drainage dewatering system. The perforated plates provided strong support for the filter but with decreased pore space. This was a primary reason the gravitational sludge dewatering systems required a longer amount of time to dewater the sludge.

SUMMARY OF INVENTION

The present invention provides a liquid-solid separator with a tank having side walls and a floor. The inside of the tank supports a filter media support structure. The filter media support structure is primarily formed of expanded metal. With the present invention, it has been found that expanded metal filter media support structure containing at least eighty-six (86) percent pore space can be used. The use of the expanded metal filter media support structure significantly reduces filtration time for a given volume of sludge, thus, permitting the filtering of the sludge at a rate significantly faster than the prior art. Further, with the present invention, it has been found that only certain locations in the separator tank need be reinforced against the weight and load of the solids in the incoming sludge. These have been found to be the first fifteen to thirty percent of the linear extent of the filter media support structure extending away from the sludge inlet ports of tank. A preferred portion of such linear extent has been found to be about twenty percent, although other variations may be used. In those areas where reinforcement against sludge weight is necessary, perforated plate filter media support structure are used.

Filter media support structure surfaces overlaying the exterior walls, the bed, and the dividing wall are covered by a high tensile strength monofilament polyester fiber filter media which serves as a liquid permeable filter screen. Additionally, it has been found that the high tensile strength monofilament polyester fiber filters can be used to facilitate filtering; to increase the longevity of the separator; and to be reused continually for approximately five years.

Gravity and hydrostatic pressure force the liquid from the sludge through the filter and into the space between the walls of the separator and the filter media support structure. The exit ports located in the bed of the tank permits the liquid to be removed.

When the sludge dries, the tank is loaded as a unit onto a transport truck or trailer and transported to a desired location, such as a landfill or other solid waste disposal site. There, the solids can be removed, leaving the tank and the high tensile strength monofilament polyester fiber filter media ready to be used again.

In its preferred form, the tank has a dividing wall is placed in the center of the tank along the longitudinal axis of the tank and perpendicular to the tank bed. The dividing wall allows liquid in the center of the tank to drain more thoroughly and more quickly by providing increased drainage surface area and decreasing the distance fluid must travel. Additionally, the outer walls contain a hinged door; sludge inlet ports, to permit the sludge to enter the tank from a storage or mixing tank; and exit ports, which are used to drain the filtered liquid out of the tank.

DESCRIPTION OF THE PREFERRED EMBODIMENT

Figure 2:
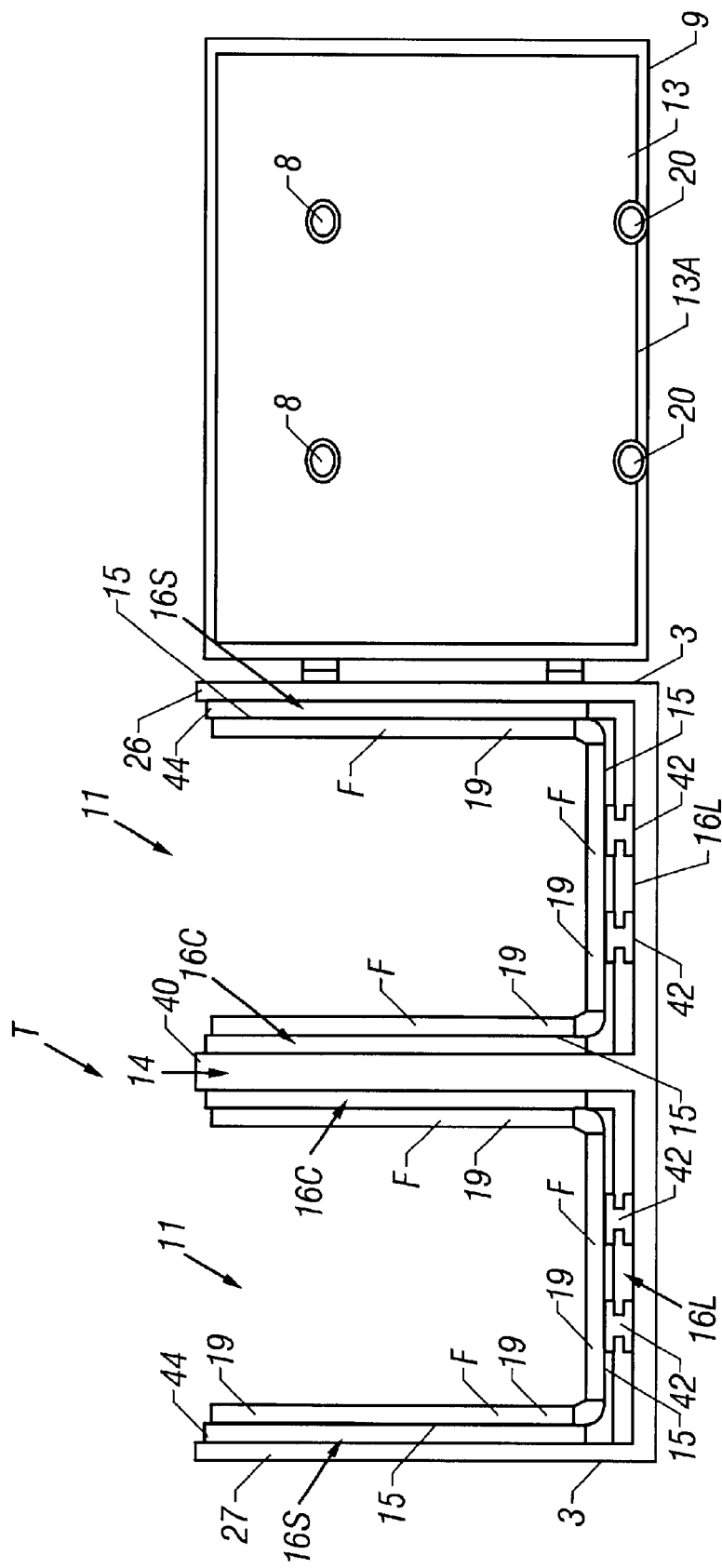
FIG. 2 is an end view of the separation tank of FIG. 1.
Figure 3:
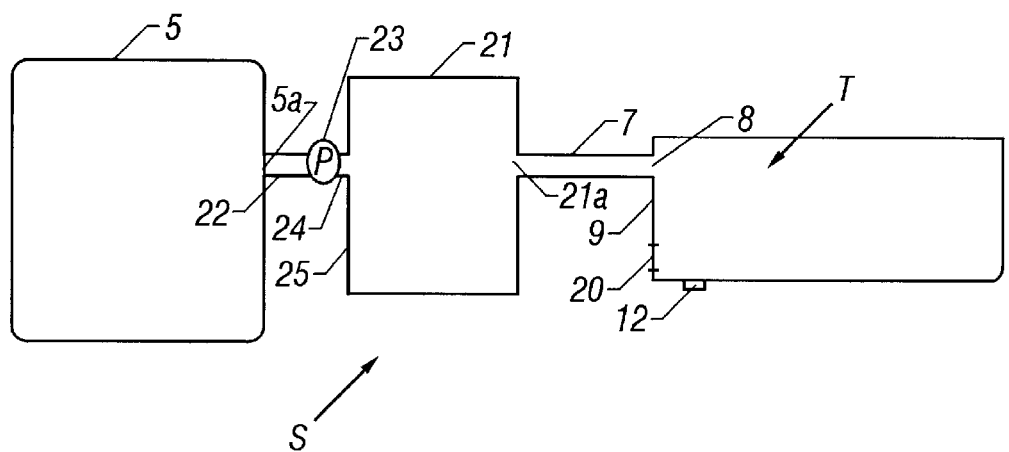
FIG. 3 is a schematic diagram of the connection of the separation tank of FIG. 1 to a storage tank.

A liquid-solid separator S according to the present invention as shown in the drawings (FIGS. 1–4) includes a tank T for the separation by filter media F of targeted solids from liquids in sludge received from a storage or receiving tank 5 (FIG. 3). Sludge, according to the present invention, is intended to include any liquid-solid mixture regardless of the particle size of the solid, composition of the liquid or percentage of liquid in the mixture. The sludge is comprised of any suitable, separable material, including sewer sludge and grease trap waste.

The sludge is composed of any of a variety of compounds or mixtures. The majority of the sludge is composed of sewer waste and/or grease trap waste. The sludge to be separated or dewatered in the tank is temporarily stored in the storage tank 5. A mixing apparatus, if desired, is included in the storage tank 5, however, primarily a separate mixing tank is used. The storage tank 5 includes at least one sludge feed outlet port 5a suitably located such as on an exterior wall. During transfer, a suitable size, such as a three inch gasketed, water tight transfer pipe or hose 22 is attached to the storage tank sludge feed outlet ports 5a. A pump 23 then moves the sludge into a mixing tank 21 through the transfer hose 22. The pump 23 is located in the pipe 22 or in either of the tanks 21 or 22.

The mixing tank 21 includes at least one sludge feed inlet port 24 suitably located, such as on an exterior walls 25 of the mixing tank 21. The sludge feed inlet port 24 is connected to the hose 22 and is positioned at any suitable location on the exterior walls 25. The sludge feed inlet port 24 is suitably sized, preferably three inch ports with conventional mounts, such as threaded S.A.E. mounts.

The mixing tank 21 is in its preferred form a 500 gallon polymer mixing tank. The mixing tank 21 uses or incorporates any suitable conventional mixing apparatus, such as, one having a solid stainless steel ⅝ inch mixing shaft with 4 inch stainless steel mixing propellers. The mixing tank 21 also contains a polymer mixing manifold having an optional neoprene shear plate. The mixing shaft is driven by a suitable conventional electric motor. Also attached to the mixing tank 21 is a positive displacement injector pump. The mixing tank 21 and all accessories associated with it are suitable for expected operating conditions and duly waterproofed.

The sludge in the mixing tank 21 is usually initially chemically treated. The sludge is treated with a suitable chemical polymer to cause flocculation of the sludge. The type of chemical polymer suitable for treating the sludge is based on the chemical composition of the sludge, and in most cases, the sludge is treated with an organic polymer. The organic polymer causes flocculation of the sludge, thereby improving the subsequent filtration of the sludge in the tank.

The mixing tank 21 holds the sludge to be treated until it is ready to be dewatered in the tank T. The mixing tank 21 includes at least one sludge feed outlet port 21a suitably located, such as on an exterior wall. During transfer, a suitable size, such as a three inch gasketed, water tight transfer hose 7 is attached to the mixing tank 21 at a sludge feed outlet port 21a. The sludge then is transported into tank T through a transfer hose 7 using any suitable fluid transfer mechanism or method. The tank T includes at least one sludge feed inlet port 8 connected to the transfer hose 7. In a preferred embodiment, tank T includes at least two inlet ports 8 as shown in the drawings (FIGS. 1, 2, and 4) located in a exterior wall 9.

Tank T, as shown in the drawings (FIGS. 1–4), is formed by bed 2, and exterior walls 3. The surface of bed 2 and exterior walls 3 form the sludge receiving cavity 11. Tank T preferably has a finish of a suitable thickness, and a coating of a suitably available red oxide primer, in order to reduce or prevent corrosion or deterioration of the interior due to exposure to the sludge. Additionally, tank T is primed inside and out, with the exterior of tank T coated with a suitable Alkyd Enamel. Additionally, bed 2 is formed from any suitable material, but is preferably formed from ¼ inch plate, 7 gauge steel. Similarly, exterior walls 3 is formed from any suitable material, but is preferably formed from 7 gauge steel. The bed and exterior walls are fastened or otherwise secured together in any suitable manner; the preferred embodiment of tank T uses continuous welds on interior junctions and skip welds on exterior junctions.

Figure 1:
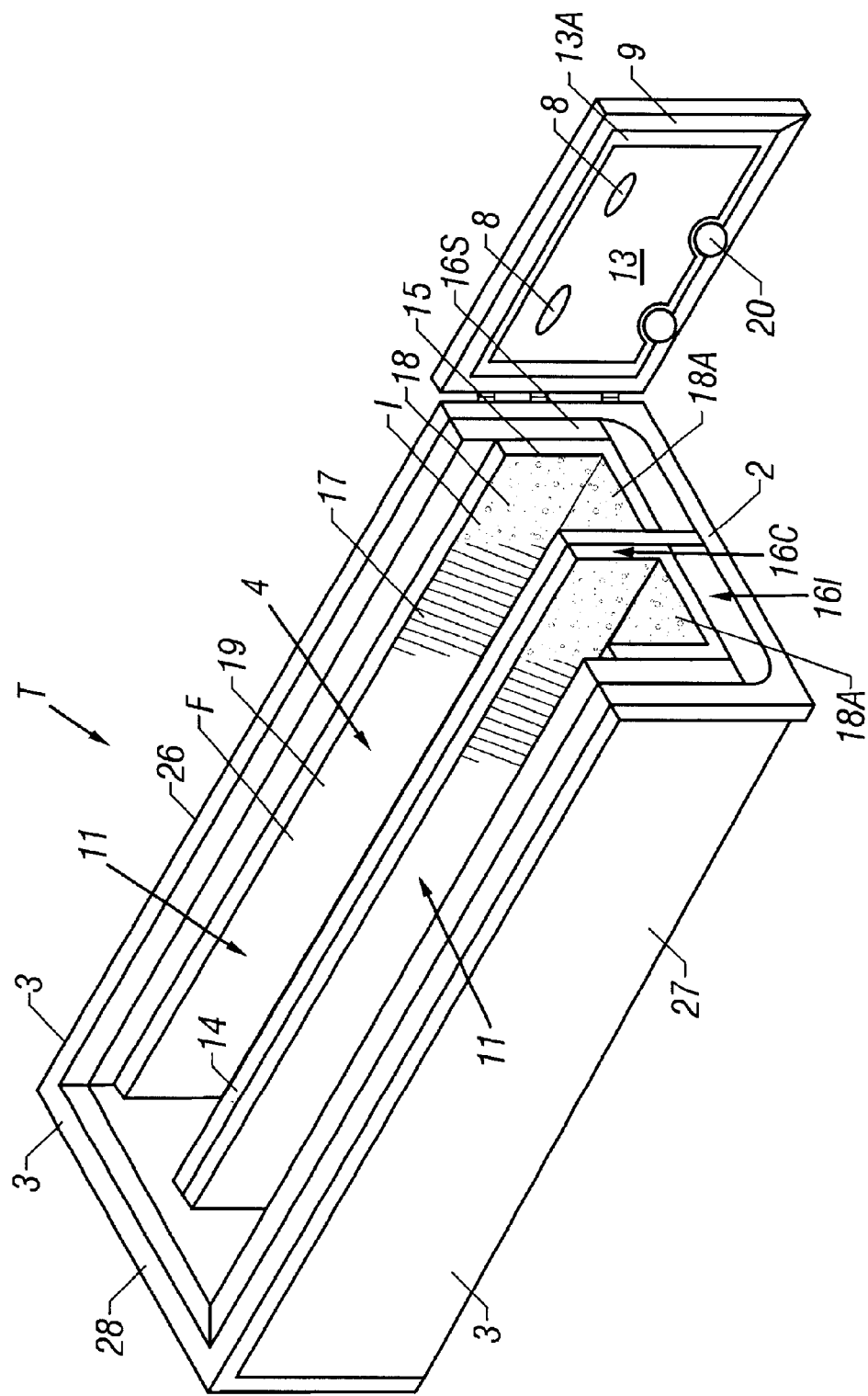
FIG. 1 is a plan view of a separation tank according to the present invention.
Figure 4:
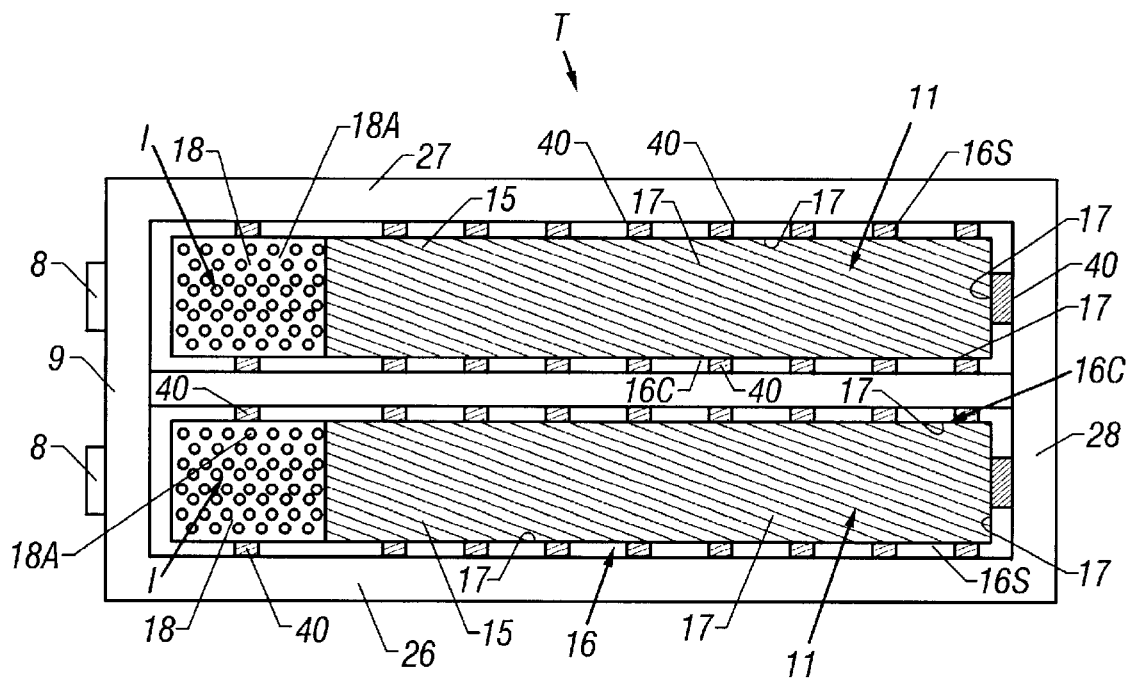
FIG. 4 is a plan view of the filter media support structure of the separation tank of FIG. 1.

The sludge enters tank T from the sludge feed inlet ports 8 located on the exterior walls 3. The sludge feed inlet ports 8 are constructed in any suitable size and manner. In the preferred embodiment the sludge feed inlet ports 8 are three inch ports with suitable threaded S.A.E. mounts. The sludge feed inlet ports 8 are positioned in any suitable location on the exterior walls 3. In the preferred embodiment the inlet ports 8 are on exterior wall 9 as shown in the drawings (FIGS. 1, 2 and 4). The sludge feed inlet ports 8 are separated in a manner that would be suitable to allow each port to fill each divided cavity 11 formed by dividing wall 14 as shown in the drawings (FIGS. 2 and 4).

The portability of tank T is facilitated by the addition of roller wheels 12 on the exterior of the bed 2 (FIG. 2). The wheels are attached directly onto bed 2 and aid in transport by facilitating the loading of tank T onto the bed of transport trucks or trailers. The roller wheels 12 are of any suitable size and design. The preferred embodiment uses roller wheels that are eight inch in diameter by ten inch in length at the rear of tank T and eight inch in diameter by eight inch in length in the front of tank T.

The removal of the solids from the dewatered sludge in tank T is accomplished through a suitable sized opening or aperture in tank T. Tank T is manufactured to use any exterior walls 3 as its hinged or removable watertight gasketed door. In the preferred embodiment, the entire exterior wall 9 functions as a hinged or removable watertight gasketed door 13 that extends or spans the width of the tank T as shown in the drawings (FIGS. 1 and 2). The hinges of the hinged gasketed door 13 are on either the interior of tank T, or preferably on the exterior of the tank T, to allow the door to swing outward. The hinged gasketed door 13 includes a rubber seal gasket 13a positioned suitably about the edge or periphery, to prevent leakage of liquids from the tank. The door frame and door of the hinged gasketed door 13 are formed of any suitable material.

In the preferred embodiment the door frame is made from 4×3×3/16 structural tubing and the door is made from 7 gauge structural steel. Additionally, the hinged gasketed door 13 includes a locking mechanism to prevent the door from opening while the sludge is being poured into tank T and during filtration. The dewatered sludge is removed from tank T through the hinged gasketed door 13 leaving an empty tank T with the filter media F still attached within tank T.

As will be set forth, the filter media support structure 15 is attached to the stainless steel support structure of bed 2, dividing wall 14, and exterior wall 26, 27, and 28, using any suitable manner, to create a composite liquid collection space 16 along the sides and floor of the tank T as shown in the drawings (FIGS. 1,2 and 4). The filter media support structure 15 is attached to bed 2, dividing wall 14, and the exterior walls 26, 27, and 28, in any suitable manner that results in the filter media support structure 15 to form a flush sludge receiving cavity that has a smooth even surface area or topography. In the preferred embodiment, the filter media support structure is attached to the stainless steel support brace attached to bed 2, dividing wall 14, and exterior wall 26, 27, and 28 to create a four inch deep composite liquid collection space 16 between the filter media support structure and the walls of tank T. In the preferred embodiment the filter media support structure 15 is attached to the bed in a manner that forms a liquid tight seal.

The preferred embodiment of tank T also includes a bisecting or dividing wall 14. The dividing wall 14 divides the sludge receiving cavity 11 in any suitable manner to create increased surface area for the sludge receiving cavity to filter the sludge; and decreases the distance the fluid must travel to be filtered without significantly altering the volume capacity of the tank. The preferred embodiment has a dividing wall 14 that divides the sludge receiving cavity I 1 into two equal cavities having substantially equal volume as shown in the drawings (FIGS. 1, 2 and 4). Additionally, in the preferred embodiment, the dividing wall 14 is positioned perpendicularly to the bed 2 and extends the entire length of the tank T along its longitudinal axis as shown in (FIGS. 1, 2 and 4). The dividing wall 14 extends upwards to any suitable height necessary to create more surface area for the sludge receiving cavity to filter the sludge. The preferred embodiment has the dividing wall 14 extending from the bed 2 to the height of the exterior walls 3. The dividing wall 14 is attached to bed 2 in any suitable manner, however, preferably welded to form a seal.

In the preferred embodiment of tank T, the dividing wall 14 perpendicularly bisects the exterior wall 9, in any suitable manner in which at least one of the sludge feed inlet ports 8 feeds into each of the divided sludge receiving cavities. The dividing wall is formed of any suitable material. In the preferred embodiment the dividing wall 14 is formed by nine upright stainless steel support braces 40 measuring four inches in thickness that are spaced equal distance across the longitudinal or length axis of tank T and are welded to extend vertically upwardly from bed 2. The filter media support structure 15 is attached, using any suitable manner, to both sides of the nine stainless steel support braces 40 forming a dividing wall with a four-inch space or void acting as a center liquid collection space 16c between the two sheets of the filter media support structure 15.

The filter media support structure 15 is thus composed of a combination of perforated plates 18 and expanded metal segments 17. The expanded metal segment 17 provides support that can withstand a substantial amount of weight, while having a large pore space. The expanded metal suitable for tank T contains at least fifty percent pore space. The preferred embodiment uses expanded metal containing at least eighty-six percent pore space.

The filter media support structure 15 for tank T composed of perforated plates 18 contains forty percent surface area opening. The perforated plate metal sheet 18 is formed, using any suitable method, preferably solid sheets of metal that are punched or bored to create a plurality of drainage holes 18a therein, thus providing a suitable support structure for the filter media F that provides rigid support that can withstand the weight and force of the incoming sludge to be dewatered.

Tank T contains an initial load-receiving section I of filter medial support structure 15 along an initial load receiving, area in bed 2 that originates at the exterior wall 9 containing the sludge feed inlet ports 8. The initial load-receiving section I extends for a distance to provide additional support for the filter media F to withstand the force and weight of the initial sludge entering tank T. With the present invention, it has been found that only certain locations in the separator tank T need be reinforced against the weight and load of the solids in the incoming sludge. These have been found to be the first fifteen to twenty percent of the linear extent of the filter media support structure 15 extending away from the sludge 8 inlet into the tank T. A preferred portion of such linear extent has been found to be about twenty percent, although other variations may be used, depending on load and weight conditions. In those areas where reinforcement against sludge weight is provided, perforated plates 18 are used for support of the filler media F.

In the preferred embodiment the initial load receiving section I of bed 2, is the first four feet of a twenty foot bed 2 extending from exterior wall 9, representing at least twenty percent of the entire longitudinal extent of filter media support structure 15. The filter media support structure 15 of the initial load receiving section I of bed 2 is composed of perforated metal plate sheets 18. The filter media support structure 15 formed of perforated plate metal sheets 18 in the initial load-receiving section I of bed 2 enables the filter media F in tank T to withstand the weight, pressure, and force of the sludge entering from the sludge inlet sludge feed ports 8. The remaining longitudinal extent of the filter media support structure 15 is formed of expanded metal.

Bed 2 of tank T supports the filter media support structure 15 with any suitable support structure that maintains a suitable lower liquid collection space or sump 16I between the floor of tank T and the filter media support structure 15. In the preferred embodiment of tank T, bed 2 uses laterally extending stainless steel support channels or braces 42, attached to the floor of tank T using any suitable manner, to create a four-inch deep lower liquid collection space 161. The preferred embodiment of tank T uses nine stainless steel support braces or channels 42 measuring four inches in width, that are equally spaced along the length of tank T, and positioned to extend laterally across the width of tank T. which places the nine stainless steel support braces parallel with exterior end walls 9 and 28. Additionally in the preferred embodiment, bed 2 contains two longitudinal stainless steel support braces or channels 44 measuring four inches in width that are spaced equal distance from side exterior walls 26 and 27 and from each other, placed along the longitudinal or length axis of tank T parallel to side exterior walls 26 and 27.

The longitudinal support braces or channels 44 are positioned to extend from the initial load-receiving section I of bed 2. In the preferred embodiment, the longitudinal braces 44 begin approximately four feet inwardly from exterior wall 9, and extend to exterior wall 28 at the front end on tank T. The two longitudinal stainless steel support braces 44 provide additional support to the filter media support structure 15 formed of expanded metal to prevent it from sagging. In the preferred embodiment, the entire stainless steel support structure is notched or otherwise provided with fluid flow gaps 46, as shown in the drawing (FIG. 2). The notches or gaps 46 allow the filtered liquid to flow freely in the liquid collection space 161.

The exterior walls 3 of tank T support the filter media support structure 15 with any suitable filter media support structure that maintains a suitable side liquid collection space 16s between the walls of tank T and the filter media support structure 15. In the preferred embodiment of tank T, exterior walls 26,27 and 28 are provided with stainless steel side upright support braces 48, attached using any suitable manner, to create a four-inch deep liquid collection space 16. The preferred embodiment of tank T uses nine stainless steel support braces or channels 48 measuring four inches in width that are spaced at equal distances along the length of tank T, extending upwardly from the stainless steel support braces 42 attached to bed 2 to the top of the exterior walls 26, 27, and 28. The filter media support structure 15 as attached to the stainless steel support braces 48 is provided with a four-inch side liquid collection space 16s along each exterior walls 26, 27, and 28 that drain into the liquid collection space 161 of bed 2.

The filter media support structure 15 is thus formed of expanded metal 17 and perforated plate 18 at locations that enable the filter media to withstand the weight of the sludge where strength and support is required, but with greatly increased dewatering capacity. In the preferred embodiment, the filter media support structure attached and supported by the exterior walls 26, 27, and 28 and the dividing wall 14 of the tank T are completely formed of expanded metal.

The filter media support structure 15 that includes expanded metal 17 and perforated plate metal sheets 18 thus maintains a greater pore space or openings which permits faster filtering of the sludge in the tank T. The expanded metal 17 in combination with perforated plates 18 in the filter media support structure 15 results in rigid support for the filter media F, with a greater pore space than the prior art. The support structure 15 can also withstand the weight of the sludge, and can reduce the length of time it takes for the dewatering of the sludge. The filtration tank with a majority of its filter media support structure 15 formed of expanded metal sheets 18 can dewater sludge at a rate of 8500 gallons per hour. This rate enables the dewatering of sludge, to be suitable for placement into a landfill, which would previously take six days, to be accomplished in as little as six hours.

The filter media 19 is positioned, in a suitable manner, in the sludge receiving cavity 11 to facilitate dewatering. In the preferred embodiment, the filter media 19 is attached to the filter media support structure 15 and covers the entire sludge receiving cavity 11. The filter media 19 is mounted on the filter media support structure 15, in a suitable manner, in which it is flush and tight allowing no leaks or migration of solids. The material and mesh size of the filter media 19 are chosen for high tensile strength and ability to retain the target solid in the particular sludge being handled. In the determination of which filter media to use, the important design considerations is the tensile strength, corrosiveness of the sludge, solvent strength, particle size and separation criteria for the sludge. Another consideration for the filter media is its suitability to employ capillary action to wick up the liquid from the sludge. The wicking action is particularly helpful with sludge containing fine particles that do not drain well and wherein the liquid tends to pool on top of the sludge. Those with skill in the art choose from a variety of fibrous filters on the market to meet the aforementioned design criteria.

The preferred embodiment of tank T uses a filter media that is a monofilament modified satin weave polyester filter material having a 390 CFM, tensile strength of 1590 LB/IN and particle retention of 330 microns. The preferred embodiment can use filter media with tensile strength ranging from 500 LB/IN to 1820 LB/IN. The filter media F is mounted onto the filter media support structure 15 using any suitable means. The preferred embodiment uses stainless steel locking cap nuts 60 to mount the filter media F onto the filter media support structure 15. The strength and durability of the filter media F prevents any clogging of the filter media support structure 15 by the filter media F. Additionally, the strength and durability of the filter media F removes any requirement for a separate, additional filter screen as was required of the prior art. With the present invention, the filter media F allows the continual reuse of the filters for approximately five years. The monofilament polyester filter fiber material of the type mentioned above and the media support structure provide effective filtration yet with adequate strength against the weight loads involved. Further, the monofilament polyester filter fiber material need not be discarded along with the solids as was previously the case with the prior art. The absence of a filter screen between the filter media and the filter media support structure allows the liquid from the sludge to pass through the filter media and filter media support structure at a faster rate, resulting in the dewatering of the sludge in a shorter period of time than previously been accomplished.

The liquid of the sludge passes through the filter media 19 onto the filter media support structure 15. When the liquid reaches the filter media support structure 15 it passes through the pore space of the filter media support structure 15. The liquid passes through the filter media support structure 15 consisting of the expanded metal 17 at a faster rate than the filter media support structure 15 consisting of the perforated plate 18. After passing through the filter media support structure 15, the liquid collects in the lower liquid collection space 161 between the filter media support structure 15 and the tank 1.

The liquid collection space 16 holds or retains the liquid until the tank 1 is drained. The removal of the collected liquid is accomplished through any suitable manner. The preferred embodiment uses liquid outlet drain ports 20. The liquid outlet drain ports 20 can be constructed in any suitable manner, however, are preferably three inch ports with any suitably threaded S.A.E. mounts. The liquid outlet drain ports are placed on any exterior wall 3. In the preferred embodiment six liquid outlet drain ports 20 located at spaced positions along the side walls 26 and 27 of the tank 1. Each of the drain ports 20 have water tight seal that close to prevent the removal of the liquid. The drain ports 20 are preferably positioned at a level below the level of the liquid filter screen 19 flush with the lower liquid collection space 161 at the bottom of tank T.

It should be appreciated that if changes and modifications are made to the above described embodiments without departing from the inventive concept thereof, but is intended to include all modifications that are made to the above described embodiment. Therefore it is to be understood that the form of the invention herewith shown and described is to be taken as a preferred example of the same, and that various changes in the shape, size, and arrangement of parts resorted to, without departing from the spirit of the invention or scope of the claims. The foregoing disclosure and description of the invention are illustrative and explanatory thereof, and various changes in the size, shape, materials, components, and method of operation made without departing from the spirit of the invention.

What is claimed is:

1. A liquid-solid separator for separating liquids from solids in a sludge comprising:
   a tank having a bed and outer walls extending upwardly from said bed, said bed and said outer walls defining a sludge receiving cavity;
   at least one of said outer walls having an inlet for entry of sludge into the tank;
   a liquid permeable filter media for separating the solids from the liquids in the sludge;
   a filter media support structure mounted, extending along the sludge receiving cavity and providing support surfaces to strengthen the filter media;
   said filter media support structure being formed of perforated plates for an initial load receiving area for about fifteen to thirty percent of its linear extent from the inlet for the sludge; and the remaining extent of the filter media support structure being formed of expanded metal.

2. A liquid-solid separator as in claim 1 wherein the filter media support structure is spaced from the sludge receiving cavity to provide a liquid collection space.

3. A liquid-solid separator as in claim 1 further including:
   at least one dividing wall in the tank extending upwardly from the bed and having liquid permeable filter media mounted thereon to provide additional filter surface area for the sludge receiving cavity; and
   said filter media support structure mounted on said dividing wall being formed of expanded metal.

4. A liquid-solid separator as in claim 1, wherein the liquid permeable filter media is formed of monofilament polyester fiber material.

5. A liquid-solid separator for separating liquids from solids in a sludge comprising:
   a tank having a bed and outer walls extending upwardly from said bed, said bed and said outer walls defining a sludge receiving cavity;
   at least one dividing wall in the tank extending upwardly from the bed to provide additional filter surface area for the sludge receiving cavity;
   at least one of said outer walls having an inlet for entry of sludge into the tank;
   a liquid permeable filter media, formed of monofilament polyester fiber, mounted in the sludge receiving cavity for separating the liquids and solids of the sludge;
   a filter media support structure mounted, extending along the sludge receiving cavity and providing support surfaces to strengthen the filter media;
   said filter media support structure being formed of perforated plates for an initial load receiving area for about fifteen to thirty percent of its linear extent from the inlet for the sludge; the remaining extent of the filter media support structure being formed of expanded metal; and
   said filter media support structure is spaced from the sludge receiving cavity to provide a liquid collection space.

6. A separator as in claim 5 wherein at least one outer wall of the tank is a door.

7. A separator as in claim 5 wherein at least one outer wall has at least one exit passage to drain filtered liquid from said liquid collection space.

8. A liquid-solid separator for separating liquids from solids in a sludge comprising:
   a tank having a bed and outer walls extending upwardly from said bed, said bed and said outer walls defining a sludge receiving cavity;
   at least one dividing wall in the tank extending upwardly from the bed to provide additional filter surface area for the sludge receiving cavity;
   at least one of said outer walls having an inlet for entry of sludge into the tank;
   at least one outer wall of the tank is a door;
   a liquid permeable filter media, formed of monofilament polyester fiber, mounted in the sludge receiving cavity for separating the liquids and solids of the sludge;
   a filter media support structure mounted extending along the sludge receiving cavity and providing support surfaces to strengthen the filter media;
   said filter media support structure being formed of perforated plates for an initial load receiving area for about fifteen to thirty percent of its linear extent from the inlet for the sludge; the remaining extent of the filter media support structure being formed of expanded metal; and
   said filter media support structure is spaced from the sludge receiving cavity to provide a liquid collection space;
   at least one outer wall has at least one exit passage to drain filtered liquid from said liquid collection space.

\* \* \* \* \*